United States Patent Office 3,778,374
Patented Dec. 11, 1973

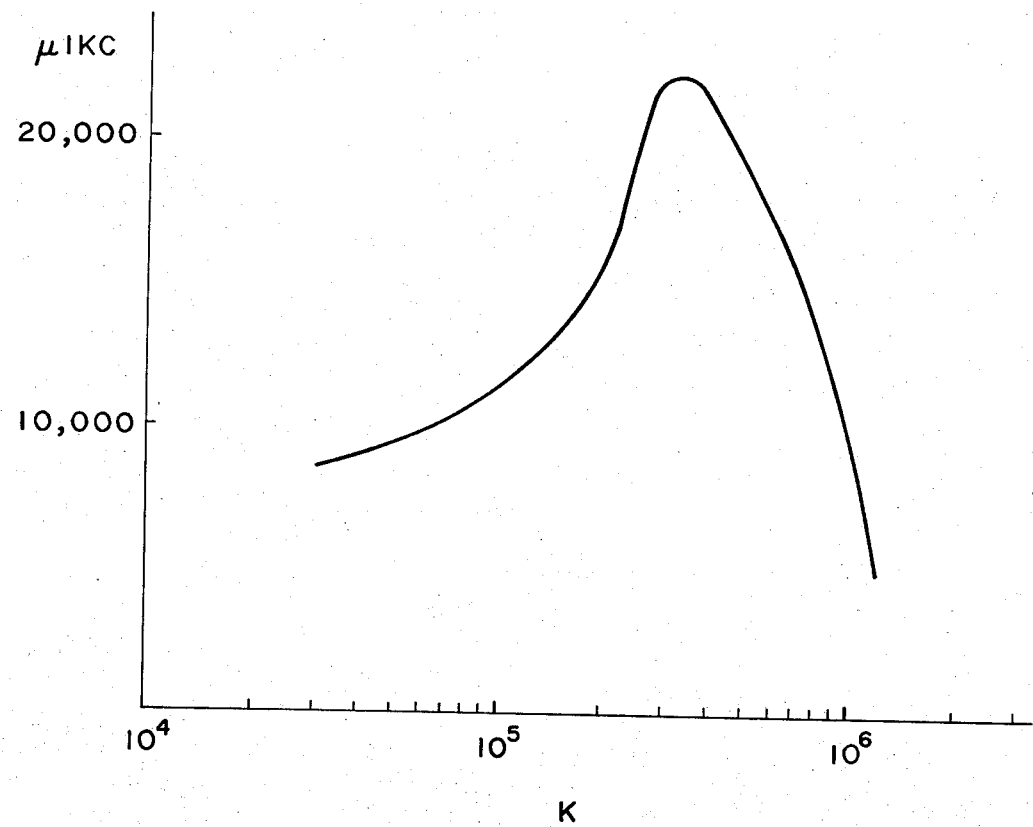

3,778,374
PROCESS FOR PRODUCING FERRITES
Yuzo Shichijo, 12, 2-chome, Seifuso, Toyonaka, Osaka Prefecture, Japan; Gyoichi Asano, 15-30 Segawa, Minoo, Osaka Prefecture, Japan; and Eizo Takama, 233 Koshien, Nishinomiya, Hyogo Prefecture, Japan
Continuation-in-part of application Ser. No. 117,120, Feb. 19, 1971, which is a continuation of application Ser. No. 16,261, Mar. 3, 1970, which is a continuation-in-part of application Ser. No. 656,301, July 5, 1967, which in turn is a continuation-in-part of application Ser. No. 351,754, Mar. 13, 1964, all now abandoned. This application Dec. 22, 1971, Ser. No. 211,936
Claims priority, application Japan, May 27, 1963, 38/27,338
Int. Cl. C04b *35/38*
U.S. Cl. 252—62.62                                          2 Claims

ABSTRACT OF THE DISCLOSURE

A process of producing a spinel-type ferrite having high magnetic permeability and high flux density comprises presintering in air, sintering in a more reducible atmosphere than that of next sintering without depositing any other phase than the spinel-type ferrite one so as to activate reaction, sintering in an equilibrium atmosphere and cooling in an equilibrium atmosphere.

---

This application is a continuation-in-part of our copending U.S. patent application Ser. No. 117,120, filed Feb. 19, 1971, now abandoned, as a streamlined continuation of U.S. patent application Ser. No. 16,261, filed Mar. 3, 1970, now abandoned, filed as a continuation-in-part of U.S. patent application Ser. No. 656,301, filed July 5, 1967, now abandoned, as a continuation-in-part of U.S. patent application Ser. No. 351,754, filed Mar. 13, 1964, now abandoned.

This invention relates to processes for producing spinel-type cubic soft magnetic materials having high magnetic permeability and high flux density. Usually, the process of ferrites preparation comprises the following operations. The compounds which are to form the ferrite by a solid state reaction are mixed in a steel ball mill. The dried powder is presintered at a temperature between 800 and 1000° C. in air, nitrogen or water vapor atmosphere in order to bring about the initial chemical reaction between the constituents. In order to produce a chemically homogeneous sample, the calcined powder is again intensively milled and mixed. This powder, after the addition of a binder, is pressed into the required shape. The pressed products are sintered at a temperature between 1000 and 1500° C. in an equilibrium atmosphere. The conditions for sintering the ferrite in an equilibrium atmosphere have been studied in detail by J. M. Blank, as disclosed in U.S. Pat. No. 3,027,327, dated Mar. 27, 1962.

In accordance with this U.S. patent to Blank, for effecting the sintering in the equilibrium atmosphere, the derivative of the natural logarithm of the partial pressure of the oxygen in the ambient atmosphere with respect to the reciprocal of the absolute temperature of the ambient atmosphere $[d(\ln P_{O_2})/d(1/T)]$ remains constant and is equal to the negative of K in which K has a value of from $4.0 \times 10^4$ to $8.2 \times 10^4$. The above derivative $d(\ln P_{O_2})/d(1/T)$ will hereinafter be referred to as $-K$.

On the other hand, the present invention relates to a method of making a ferrite having a superior property to that of the ferrite sintered in the equilibrium atmosphere. In the method of sintering the ferrite herein, the ferrite obtained has a property superior to the ferrite sintered merely in the equilibrium atmosphere with the following observations having been made.

When the ferrite is first sintered in a more reducible atmosphere than that of its next sintering step and is then sintered in an equilibrium atmosphere, the permeability and flux density thereof can be remarkably improved as compared with the ferrite sintered only in the equilibrium atmosphere. Accordingly, the reduction must be effected in such a degree that no other phase than a ferrite phase is deposited. If a phase other than the ferrite phase is deposited by the reduction, it is quite difficult to make all phases a single ferrite phase even though the subsequent sintering in the equilibrium atmosphere is applied. Therefore high permeability ferrite is obtainable. Moreover, when the method of this invention is applied to a manganese-zinc type ferrite having the highest magnetic permeability and flux density in cubic ferrites, the magnetic permeability which has been limited to 10,000 by any known conventional method can be grealy improved and the flux density can be increased by about 10%.

In the single figure drawing, a graph shows a variation of the permeability in Mn-Zn ferrite by the value of K calculated from the partial pressure of oxygen and the temperature of the sintering in the equilibrium atmosphere and those of the sintering in the reducible atmosphere which takes place before the sintering in the equilibrium atmosphere.

The process of this invention is illustrated in further detail in the following examples which are mainly for the purpose of illustrating the invention.

EXAMPLE 1

51 mol percent $Fe_2O_3$, 24 mol percent MnO and 25 mol percent ZnO were mixed together for 10 hours in a ball mill, were dried, were then presintered for 3 hours at 850° C. in air, were further crushed for 15 hours in the ball mill, had an organic binder added thereto, and were dried and granulated, and toroidal test samples were made therefrom. The samples were sintered at 1250° C. for the first time under the reduced pressure of $10^{-3}$ mm. Hg for 2 hours.

Thereafter, the samples were sintered at 1330° C. for the second time under a reduced pressure having the partial pressure of oxygen at 10 mm. Hg for 2 hours, and were cooled from 1200° C. to room temperature under a reduced pressure of $10^{-3}$ mm. Hg to prevent oxidation thereof. Magnetic permeability $\mu$ and Q at 1 kc./s., $\mu$m., $B_{10}$, Hc and Curie point of the treated toroidal samples are shown in Table 1.

TABLE 1

| Items | Conventional method | Method of this invention |
|---|---|---|
| $\mu$ 1 kc | 8,500 | 13,500 |
| Q 1 kc | 8.0 | 3.0 |
| $\mu$m | 20,000 | 27,000 |
| $B_{10}$ | 3,300 | 3,480 |
| Hc (oe.) | 0.025 | 0.015 |
| Curie point (° C.) | 95 | 95 |

It will be seen from Table 1 that magnetic permeability was very much improved by the two-step sintering of this invention.

The conditions under which the ferrite of the conventional method in Table 1 were prepared were the same as those for the ferrite of this invention except for sintering, which was carried out for 4 hours at 1330° C. in nitrogen gas containing 0.1% oxygen.

EXAMPLE 2

51 mol percent $Fe_2O_3$, 24 mol percent MnO and 25 mol percent ZnO were mixed together for 10 hours in a ball mill, were dried, were then pre-sintered for 3 hours at 850° C. in air, were further crushed for 15 hours in the ball mill, had an organic binder added thereto, and were dried and granulated. Toroidal test samples were made therefrom. The samples were sintered at 1250° C. for the first time under the reduced pressure of $10^{-3}$ mm. Hg for 2 hours.

Thereafter, the samples were sintered at 1330° C. for the second time in an oxygen containing $N_2$ atmosphere having the partial pressure of oxygen at 10 mm. Hg for 2 hours and were cooled from 1200° C. to room temperature under the reduced pressure of $10^{-3}$ mm. Hg to prevent oxidation thereof. Magnetic permeability $\mu$ and Q at 1 kc./s. $\mu$m., $B_{10}$, Hc and Curie point of the treated toroidal samples are shown in Table 2.

TABLE 2

| Items: | Characteristics |
|---|---|
| $\mu$ 1 kc. | 14,000 |
| Q 1 kc. | 2.0 |
| $\mu$m. | 29,000 |
| $B_{10}$ | 3,470 |
| Hc (oe.) | 0.015 |
| Curie point (° C.) | 95 |

It will be seen from Table 2 that, when second step sintering is carried out in an inert gas having the same partial pressure of oxygen as the reduced atmosphere of Example 1, the same excellent magnetic properties as in Example 1 were obtained.

EXAMPLE 3

Pressed toroidal test sample containing main constituents of 51 mol percent $Fe_2O_3$, 24 mol percent MnO and 25 mol percent ZnO and additional elements of 1.0 wt. $InO_2$ and 0.01 wt. percent CaO were prepared by the same process as Example 2, then sintered at 1250° C., for the first time under the reduced pressure of $10^{-3}$ mm. Hg for 2 hours and were then sintered at 1330° C. for the second time in an oxygen containing $N_2$ atmosphere having the partial pressure of oxygen at 10 mm. Hg for 2 hours and were cooled from 1200° C. to room temperature under the reduced pressure of $10^{-3}$ mm. Hg. Magnetic permeability $\mu$ and Q at 1 kc./s. $\mu$m, $B_{10}$, Hc and Curie point of the treated samples are shown in Table 3.

TABLE 3

| Items | Conventional method | Method of this invention |
|---|---|---|
| $\mu$ 1 kc | 9,800 | 22,300 |
| Q 1 kc | 23 | 7.0 |
| $\mu$ m | 15,000 | 40,000 |
| $B_{10}$ | 3,400 | 3,750 |
| Hc (oe.) | 0.03 | 0.013 |
| Curie point (° C.) | 95 | 95 |

The conditions under which the ferrite of the conventional method in this table was prepared were the same as those for the ferrite of this invention except for sintering.

Conventional sintering was carried out as follows. Pressed toroidal test samples were sintered at 1250° C. for the first time in an oxygen containing $N_2$ atmosphere having 1.5 mm. Hg for 2 hours and were then sintered at 1330° C. for the second time in an oxygen containing $N_2$ atmosphere having the partial pressure of oxygen at 10 mm. Hg for 2 hours, and were cooled in equilibrium atmosphere. In this conventional method, the derivative of the natural logarithm of the partial pressure of the oxygen of the ambient atmosphere is equal to $-5.8 \times 10^4$. When the value of $d(\ln Po_2)/d(1/T)$ is equal to $-5.8 \times 10^4$, the oxygen content of the ferrite is not changed in the sintering process, e.g. sintering is performed in the universal equilibrium atmosphere, as described in U.S. Pat. No. 3,027,327. But in the method of this invention the value of $d(\ln Po_2)/d(1/T)$ is equal to $-2.8 \times 10^5$.

So, in the method of this invention the ambient atmosphere of the first sintering is more reducible than the ambient atmosphere of the second sintering.

From this fact, it is clear that the two-step sintering method of this invention in which the ambient atmosphere of the first sintering is more reducible than the ambient atmosphere of the second sintering improves the magnetic property of ferrites remarkably.

In each of the above examples, after the first sintering step, the samples were checked for the presence of any other phase than the spinel-type ferrite phase by both X-ray and microscopic methods, but only the spinel-type ferrite phase was detected.

The values of $d(\ln Po_2)/d(1/T)$ of each example are shown in Table 4.

TABLE 4

| Example No.: | $d(\ln Po_2)/d(1/T)$ |
|---|---|
| 1 | $-2.8 \times 10^5$ |
| 2 | $-2.8 \times 10^5$ |
| 3 | $-2.8 \times 10^5$ |

These values are caculated from the partial pressure of oxygen and the keeping temperature of the first and the second sintering.

EXAMPLE 4

Pressed toroidal test samples prepared by the same process as Example 3 were first sintered at 1250° C. for two hours in atmospheres with the various partial pressure of oxygen and then sintered at 1330° C. for two hours under a nitrogen atmosphere having the partial pressure of oxygen of 10 mm. Hg and cooled in the equilibrium atmosphere.

FIG. 1 shows a relation between a value of 1 kc. of these samples and a value of K calculated from the keeping temperatures in the first and second sinterings and the partial pressure of oxygen of the atmosphere in each sintering. FIG. 1 shows that the permeability of the ferrite which was first sintered in more reducible atmosphere than that of next sintering and then treated in the equilibrium atmosphere (wherein $K = 1 \times 10^5 \sim 9 \times 10^5$) was increased as compared with the ferrite which was treated only in the equilibrium atmosphere. Particularly, in the case of $K = 2 \times 10^5 \sim 6 \times 10^5$, the permeability could be remarkably increased.

However, where a reducibility of the atmosphere in the first reducing treatment was exceeded, the permeability of the ferrite was decreased.

EXAMPLE 5

Pressed toroidal test samples were sintered under the condition of $K = 1 \times 10^6$ in Example 4 except that time maintained for the second treatment in the equilibrium atmosphere was varied from 2 to 20 hours.

Values of permeability of each sample are shown in Table 5.

TABLE 5

| Keeping time, hours: | $\mu$1 kc. |
|---|---|
| 2 | 9,400 |
| 5 | 12,000 |
| 10 | 14,000 |
| 20 | 13,800 |

Even in 20 hours treatment, the magnetic properties are inferior as compared with that of the samples treated under the condition of $K = 2 \times 10^5 \sim 6 \times 10^5$ in Example 4.

So, the reducibility of the first sintering should not exceed.

What is claimed is:

1. A process for producing a Mn-Zn ferrite having high magnetic permeability and high flux density from mixed raw metal oxide materials which have been pre-sintered in air as herein defined, which comprises a first step of sintering in a first atmosphere, and a second step of sintering in a second atmosphere at a temperature higher than said first atmosphere, whereby any other phase than the spinel-type ferrite will not be deposited, the second sintering step taking place in an equilibrium atmosphere and thereafter cooling, wherein a value obtained from dividing the differential of the natural logarithm of the partial pressure of oxygen of the first sintering step and the second sintering step by the differential of the reciprocal of the absolute temperature of the first sintering step and the second sintering step is from $-2 \times 10^5$ to $-6 \times 10^5$.

2. A process as in claim 1 wherein the atmosphere in both said first and second steps is an atmosphere under reduced pressure or an atmosphere of mixture of oxygen and inert gas.

References Cited
UNITED STATES PATENTS
3,027,327   3/1962   Blank _____ 252—62.56

OTHER REFERENCES
Smit et al.: Ferrites, 1959, pp. 255–256.

OSCAR R. VERTIZ, Primary Examiner
J. COOPER, Assistant Examiner

U.S. Cl. X.R.
423—594